(12) United States Patent
Boote et al.

(10) Patent No.: US 6,372,008 B1
(45) Date of Patent: Apr. 16, 2002

(54) SOIL ADDITIVE AND ASSOCIATED PROCESSES

(76) Inventors: Marvin L. Boote; Bradley J. Boote, both of 14525 Highway 7, Minnetonka, MN (US) 55345

( * ) Notice: Subject to any disclaimer, the term of this patent is extended or adjusted under 35 U.S.C. 154(b) by 0 days.

(21) Appl. No.: 09/295,004

(22) Filed: Apr. 20, 1999

Related U.S. Application Data

(60) Provisional application No. 60/082,425, filed on Apr. 20, 1998.

(51) Int. Cl.$^7$ .............................. C05D 9/00; A01N 25/00
(52) U.S. Cl. ............................................. 71/63; 71/64.03
(58) Field of Search ...................... 71/63, 64.02, 64.03, 71/64.05

(56) References Cited

U.S. PATENT DOCUMENTS

| | | |
|---|---|---|
| 3,679,377 A | 7/1972 | Young |
| 4,069,034 A | 1/1978 | Hoover |
| 4,071,347 A | 1/1978 | Piccolo et al. |
| 4,181,516 A | 1/1980 | Gray |
| 4,274,860 A | 6/1981 | Firth, Jr. |
| 4,292,085 A | 9/1981 | Piccolo et al. |
| 4,507,273 A | 3/1985 | Hudson |
| 4,659,557 A | 4/1987 | Lenz et al. |
| 4,792,349 A | 12/1988 | Trimm et al. |
| 5,108,481 A | 4/1992 | Shutt |
| 5,268,159 A | 12/1993 | Holtmann |
| 5,411,569 A | 5/1995 | Hjersted |
| 5,514,201 A | 5/1996 | Marijuan De Santiago et al. |
| 5,538,530 A | 7/1996 | Heaton et al. |
| 5,698,001 A | 12/1997 | Keenportz |

FOREIGN PATENT DOCUMENTS

| | | |
|---|---|---|
| EP | 0 168 308 A1 | 1/1986 |
| EP | 0 567 373 A1 | 10/1993 |
| JP | 64-13004 | 7/1987 |
| SU | 1608127 A1 | 11/1990 |

OTHER PUBLICATIONS

NebGuide "Fertilizer Suggestions for Soybeans", by E.J. Penas et al., Cooperative Extension Institute of Agriculture and Natural Resources, University of Nebraska–Lincoln, issued Nov. 1987, electronic version issued Aug. 1996, pp. 1–5.

Prince Agri Products, Inc. brochure "Iron (Fe)", 1997, pp. 1–4.

*Primary Examiner*—Steven P. Griffin
*Assistant Examiner*—Eileen E. Nave
(74) *Attorney, Agent, or Firm*—Dicke, Billig & Czaja, P.A.

(57) ABSTRACT

An assemblage of granules including zinc sulfate heptahydrate and iron sulfate heptahydrate in a substantially integrated granular form is provided for use in e.g., the fertilizer industry. A binder, such as humate, may be used to form the granules. The granules may be dried until a slight melt is formed thereon. The granules may then be cooled to remove remaining free water. Related methods provide additional advantages.

28 Claims, 1 Drawing Sheet

SOIL ADDITIVE AND ASSOCIATED PROCESSES

CROSS-REFERENCE TO RELATED APPLICATION

This application claims priority under 35 U.S.C. § 119 (e) to, and hereby incorporates by reference, U.S. Provisional Patent Application No. 60/082,425, filed Apr. 20, 1998.

BACKGROUND OF THE INVENTION

1. Field of the Invention

The invention relates to soil additives, and more particularly, to processes of manufacturing granular secondary and trace mineral soil additives containing e.g. sulfur, zinc, iron and/or other elements. The invention also relates to soil-additive products produced by, or in association with, such processes.

2. Description of Related Art

The iron deficiency known as iron chlorosis affects many crop and landscape plants in the United States and elsewhere. Iron is required to form chlorophyll, for example, which is necessary for photosynthesis and which causes green coloration. An inadequate iron supply in the soil can cause yellow coloration, poor growth and other undesirable effects. Iron chlorosis is especially prevalent in the high-pH soils of the western United States, for example.

Various methods of treating iron chlorosis are known. It is known, for example, to apply elemental sulfur combined with ferrous sulfate to the soil. It is also known to apply iron chelates to the soil during planting or afterwards. For example, U.S. Pat. No. 4,181,516, issued to Gray, Jan. 1, 1980, which is incorporated herein by reference, discloses adding iron chelates to soil to correct iron chlorosis in plants. The iron chelates are prepared by adding ferric iron salts to concentrated solutions of hot caustic effluents from bleach plants of wood pulp mills. In cases of iron chlorosis in trees, it is known to inject ferric ammonium citrate or iron sulfate directly into the trunks. It is also known to apply foliar sprays containing ferrous sulfate, ferrous sulfate heptahydrate, or chelated iron.

U.S. Pat. No. 5,108,481, issued to Shutt, Apr. 28, 1992, which is incorporated herein by reference, discloses a pelletized ferrous sulfate monohydrate product and a method of making the product. Hard, spherical ferrous sulfate monohydrate pellets are manufactured by combining ferrous sulfate monohydrate powder with an aqueous solution of ammonium sulfate in a conventional pelletizing apparatus. The pellets therefrom are heated to remove excess water.

Of course, plants require a variety of nutrients in addition to iron. Zinc, sulfur and other elements are considered necessary for proper growth and development. A wide variety of fertilizer products are known in the art for supplying these necessary elements when deficiencies otherwise exist. However, a need exists for manufacturing heptahydrate metallic salts into a granular form usable to such industries as e.g., fertilizer. There is a specific need for granular heptahydrate trace (micro) element products to treat deficient soils.

SUMMARY OF THE INVENTION

For the first time, the inventors of the subject matter disclosed in this application have developed a way to meet the above-described (and other) needs. Embodiments of the invention are used to convert metallic heptahydrate salts, such as iron and zinc sulfates, into agricultural-type (preferably granular) materials such as fertilizer products. More particularly, fertilizer products produced according to embodiments of the invention are highly effective in addressing iron chlorosis and other problems in various plants, including crop plants (e.g. all types of grains, fruit and nut trees, potatoes, onions, vine crops, etc.), and with the added advantage of lower cost.

There is provided an assemblage of granules, the assemblage including a composition and a binder. The composition may include at least one crystalline hydrated metal salt. The binder may be present in an amount sufficient to bind the crystalline hydrated salt into granules. The composition may include ferrous sulfate heptahydrate and zinc sulfate heptahydrate. The composition may include between about 10% and about 15% iron by weight and between about 3% and 7% zinc by weight. The binder may include humate, which may be present in an amount between about 20% and 40% by weight.

There is also provided a process for making an assemblage of granules, the process including mixing a composition and a binder and granulating the binder- composition mixture with a quantity of water. The composition may include hydrated ferrous sulfate and hydrated zinc sulfate. The binder may include a humate. The process may further include drying the granulated composition and binder. The drying may continue until a slight melt is formed in the granules. The process may further include cooling the dried granules.

There is further provided an assemblage of granules made by a process including mixing a composition and a binder and granulating the binder-composition mixture. The composition may include ferrous sulfate heptahydrate and zinc sulfate heptahydrate. A quantity of water may be added during granulation. The binder may include humate. The granules may be exposed to a first temperature until a slight melt is present in the granules. The granules may be further exposed to a second temperature, the second temperature less than the first temperature.

There is still further provided a process of applying an assemblage of granules to plants to prevent or alleviate chlorosis. The process may include providing the assemblage of granules and applying the assemblage to the plants such that the ferrous sulfate and zinc sulfate are available to the plants. The assemblage of granules may include ferrous sulfate heptahydrate and zinc sulfate heptahydrate combined with a binder, the binder including humate. The assemblage of granules may be applied directly to the soil. Or the assemblage of granules may be dissolved or suspended in an aqueous solution and the aqueous solution applied to the soil or as a foliar application.

Embodiments of the invention include processes to manufacture granular secondary and trace mineral soil additives containing significant amounts of iron, zinc and/or sulfur. A mixture of finely ground humates and ferrous/zinc sulfate is produced, according to one embodiment, and is granulated in e.g. a drum or pan granulator. The resulting material is dried, screened and then bagged for use in a fertilizer product for ultimate mixing with other fertilizer-type materials and application to e.g., high-pH soils commonly associated with chlorotic plant conditions. To the inventors' knowledge, this is the first time it has been recognized that ferrous sulfate heptahydrate and zinc sulfate heptahydrate can be used in the production of a granulated-type fertilizer product.

The chemical composition and analysis of actual starting materials may be quite variable. Starting materials include commercially available ferrous sulfate heptahydrate, zinc sulfate heptahydrate, and other hydrated salts derived from reacting metals with sulfuric acid, e.g., galvanization byproducts.

BRIEF DESCRIPTION OF THE DRAWING

Embodiments of the invention will be described with respect to the FIGURE which is a flowchart showing process steps according to one exemplary embodiment.

DETAILED DESCRIPTION OF PREFERRED EMBODIMENTS

Figure 1:
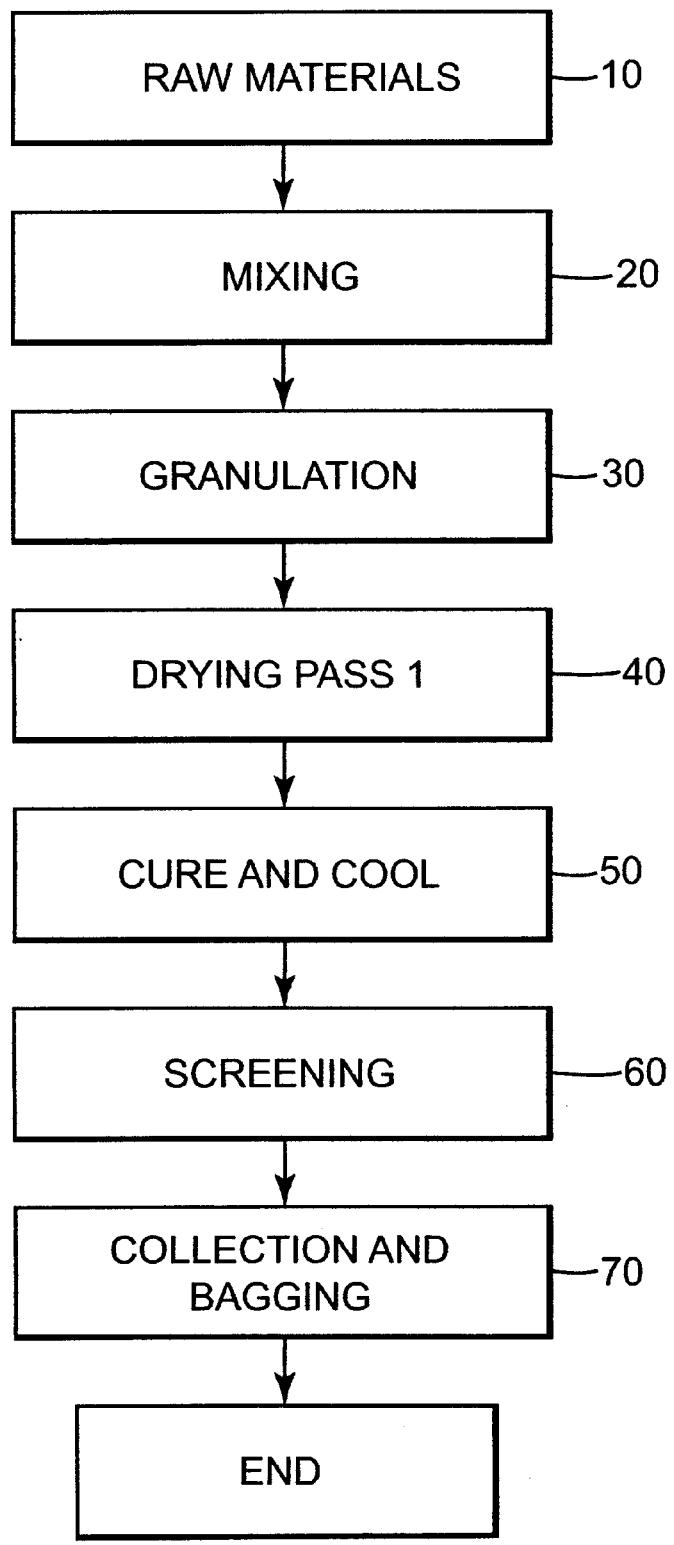

First, raw (starting) materials are obtained in a substantial quantity, as shown at step 10 in the FIGURE. In one embodiment, raw materials include ferrous sulfate heptahydrate and zinc sulfate heptahydrate. The raw materials are combined in a standard industrial mixing device, e.g. an industrial mixer with a hopper feed, to accomplish mixing step 20.

Also deposited into the mixer hopper in mixing step 20 is a desired quantity of a humate material. Humate materials, or humates, are organic materials compressed in the earth over geologic time periods and which contain high concentrations of humic acids. Humates are basically a salt form of humic acids and have high ion-exchange capabilities. According to embodiments of the invention, humates are used to bind or increase the cohesiveness of the raw materials.

The humates for use according to the invention, preferably derived from a suitable source of leonardite/lignite, are mixed with the raw materials in a ratio of between about 20% and about 40% humates to between about 60% and about 80% raw materials. More particularly, according to certain embodiments, about 25% to about 35% humates and about 65% to about 75% raw materials are used. According to one particular embodiment, about 1400 pounds of raw material is mixed with about 600 pounds of humates, yielding a ratio of about 70% raw material to about 30% humates. It is generally desirable to add the least amount of humates possible to achieve a final product with an iron content of at least about 10%; iron oxide material or other iron material also can be added to the mix to achieve a desired iron percentage. Of course, quantities of other elements can be manipulated similarly as well, e.g. by the addition of manganese sulfate and other mineral salts for correction of other trace mineral deficiencies.

According to one embodiment, a 30% humate concentration causes sufficient cohesiveness of the starting material. Alternatively, or additionally, a different binder (sticking aid) such as bentonite or other clay, lignosulfate, etc. can be used to enhance cohesiveness.

After mixing step 20, the humate-raw material mixture passes to granulation step 30. According to one embodiment, the mixer drops the mixture onto a belt or other conveying device that feeds into a surge hopper and then into an auger or yet another conveying device that feeds directly into a granulator.

According to one embodiment, the granulator is a relatively low-speed (about 8 to about 10 revolutions per minute) granulating drum with a diameter of about 30 inches and a length of about 15 feet. The granulator is set at a slight slope such that starting materials added at the high end gradually work toward the low end as the drum rotates. Of course, other types of granulators, such as pan granulators, can also be used.

In operation, the humate-raw product mixture is fed into the granulator along with a desired quantity of water, e.g. about 10% to about 15% by weight of the mixture. The exact percentage of water will depend on e.g. the moisture content of the ambient atmosphere to which the mixture has been exposed, as well as ambient temperature and/or other factors.

After granulation step 30, the granulated product is deposited on a belt or other suitable conveying device for transport to an industrial drying apparatus in which drying step 40 occurs. Excess drying heat at this stage has been found to cause the product to stick together in an undesirable fashion. According to one embodiment, an internal dryer temperature is set at a first temperature of about 140° F. This causes the material to have a very slight melt as it passes through the drier and thus increases granular strength, without driving out all of the remaining moisture. It is believed that the heptahydrate ferrous and zinc sulfates diffuse into the humates via this process, thereby helping to further bind the mixture together. This is important e.g. so that the material stands up to storage and packing conditions without breaking down or falling apart.

A second or exit temperature of the drying apparatus according to the invention is set at about 110° F. Drying temperatures preferably are set cool enough such that the granules of the product emerge still slightly moist, without being melted completely together or otherwise losing their shape.

Depending on ambient conditions, the type of heptahydrate, and other factors, the internal drying temperatures referenced above can be in the range of about 135° F. to about 145° F., about 125° F. to about 140° F., or other desired temperature according to embodiments of the invention. Temperatures above 145° F. and below 125° F. are also contemplated. Further, exit temperatures can be in the range of about 105° F. to about 115° F., about 110° F. to about 140° F., or other desired temperature according to embodiments of the invention. Exit temperatures above 140° F. and below 125° F. are also contemplated. The internal and exit temperatures preferably are set to achieve the desired degree of melt, without driving off all the water. This is in distinction to prior art drying processes which actually burn the initial product at 400° F. or more, eliminating the water and producing an ash-like substance. Embodiments of the invention also avoid a "soupy" product having too much moisture.

According to one embodiment, the product emerging from drying step 40 is cured and cooled at step 50 for a desired period of time, which increases the hardness of the product. The curing and cooling depicted at step 50 may be conducted one or more times to achieve a desired level of hardness. However, if a cooling device is not available, or if otherwise desirable, the product optionally passes through the same drier again or through a different drier, this time with no heat or with significantly reduced heat, to remove all or substantially all of the remaining free moisture. Whether this optional drying step is needed also can depend on factors such as ambient humidity, temperature, etc.

After drying, the product is fed by a belt-elevator combination or other conveying device into a vibrating screener at the top of a hopper, to execute screening step 60. Oversize granules fall off the end of the screener into an auger or other conveying device which elevates them to a grinder. The grinder grinds the oversize granules, which then drop back down into an elevator or other device and ultimately are elevated back to the vibrating screener. It is foreseeable that some oversize granules might have to pass through the grinder two or three times before reaching an appropriate size, e.g. for passing a −6+20 standard mesh screen. Once the granules are of an appropriate size, they fall through the screener into the hopper. The moisture content of the product is adjusted by drying step 40 and/or cure-cool step 50 to avoid blinding or clogging the screen(s) of the vibrating screener. Of course, if granulation step 30 produces uniform granules all of a desired size, screening step 60 can be eliminated.

Generally speaking, the screening process occurs more rapidly than the granulating process. In industrial applications where granulating and screening are not accomplished simultaneously, about four days' worth of mixing/granulating may often be screened in about one day. With such applications, the screen can be removed for the first drying pass and the grinder turned off, allowing all material to pass through to the final collection point for manual or automated redirection to the drier. After the second (or a subsequent) drying pass, the screen is replaced and the end product is produced. The end product is then collected and prepared for shipment at step 70, e.g. by bagging.

According to preferred embodiments, the end product is sold as a fertilizer product for direct use or for ultimate mixture with other fertilizer components. The −6+20 mesh size of the final granules is chosen to optimize the final, post-shipment mixing step. Of course, such mixing can occur directly after step 70 without intervening shipment, and different mesh screen sizes are contemplated according to the invention e.g. to accommodate different end uses.

While the invention has been described with respect to certain specific preferred embodiments, the description should be considered illustrative and not as limiting the scope of the invention. For example, although humates are desirable to promote cohesiveness, at least in part because they also have a high iron content, it is contemplated that other similar binding materials may be useable according to the invention. Non-fertilizer uses of the final product are also possible. Further, although primary embodiments of the invention relate to a fertilizer product for ultimate mixing with other fertilizer components, direct use without additional materials or with additional non-fertilizer materials also should be considered within the scope of the invention. Many other metals are in heptahydrate form and can be used to produce product according to the invention. Manganese, magnesium, copper and any of the other trace minerals used in e.g. agriculture are contemplated. Thus, other variations and embodiments will be apparent to those of ordinary skill.

What is claimed is:

1. An assemblage of granules, comprising:
    a composition comprising ferrous sulfate heptahydrate and zinc sulfate heptahydrate; and
    a binder to aid in binding the ferrous sulfate heptahydrate and zinc sulfate heptahydrate into substantially integrated granules, the granules including a partial melt.

2. The assemblage of claim 1, in which the composition comprises between about 10% and about 15% iron by weight and between about 3% and about 7% zinc by weight.

3. The assemblage of claim 1, in which the binder comprises humates.

4. The assemblage of claim 3, in which between about 20% and about 40% humates by weight is present.

5. The assemblage of claim 3, in which the ferrous sulfate heptahydrate and zinc sulfate heptahydrate are bound in the substantially integrated granules only by the humates and the partial melt.

6. The assemblage of claim 1, further comprising a salt of a trace element other than iron and zinc.

7. A process of making an assemblage of granules, comprising:
    mixing a composition and a binder, the composition comprising ferrous sulfate heptahydrate and zinc sulfate heptahydrate;
    granulating the binder-composition mixture with a quantity of water; and
    heating the granulated binder-composition mixture until only a partial melt occurs, without driving away all moisture.

8. The process of claim 7, in which the binder-composition mixture comprises between about 10% and 15% by weight iron and between about 3% and about 7% by weight zinc.

9. The process of claim 7, in which the binder comprises humates.

10. The process of claim 9, in which the mixed humates are present in an amount between about 20% and about 40% by weight.

11. The process of claim 7, wherein the process comprises drying the granulated binder-composition mixture.

12. The process of claim 11, in which the drying comprises exposing the granulated binder-composition mixture to a first temperature between about 135° F. and about 145° F.

13. The process of claim 12, in which the drying comprises exposing the granulated binder-composition mixture to a second temperature between about 105° F. and about 115° F.

14. The process of claim 13, further comprising cooling the dried granulated binder-composition mixture.

15. The process of claim 11, further comprising screening the granulated binder-composition mixture.

16. The process of claim 7, wherein the ferrous sulfate heptahydrate and the zinc sulfate heptahydrate are substantially integrated into the granules.

17. An assemblage of granules comprising ferrous sulfate heptahydrate, zinc sulfate heptahydrate and a binder, the granules including a partial melt, said assemblage made by a process comprising:
    mixing a composition and a binder, the composition comprising ferrous sulfate heptahydrate and zinc sulfate heptahydrate;
    granulating the binder-composition mixture with a quantity of water; and
    heating the granulated binder-composition mixture until only a partial melt occurs, without driving away all moisture.

18. The assemblage of claim 17, in which the binder-composition mixture comprises between about 10% and about 15% by weight iron and between about 3% and about 7% by weight zinc.

19. The assemblage of claim 17, in which the binder comprises humates.

20. The assemblage of claim 17, in which the binder comprises between about 20% and about 40% by weight humates.

21. The assemblage of claim 17, the process further comprising exposing the granulated binder-composition mixture to a first temperature until the partial melt is present in said granules.

22. The assemblage of claim 21, the process further comprising exposing the granulated binder-composition mixture to a second temperature, the second temperature less than the first temperature.

23. The assemblage of claim 17, the process further comprising screening the granulated binder-composition mixture.

24. A process of applying an assemblage of granules to plants to prevent or alleviate chlorosis, comprising:

provliding the assemblage of granules comprising ferrous sulfate heptahydrate and zinc sulfate heptahydrate in a substantially integrated granular form combined with a binder comprising humate, the granules including a partial melt; and applying the assemblage of granules to the plants such that said ferrous sulfate and said zinc sulfate are available to the plants for uptake.

25. The process of claim 24, in which the assemblage of granules is applied to soil.

26. The process of claim 24, further comprising dissolving or suspending the assemblage of granules in an aqueous solution.

27. The process of claim 26, in which the aqueous solution is applied as a foliar application.

28. The process of claim 24, wherein the partial melt is imparted to the granules without driving away all moisture.

* * * * *